No. 610,359. Patented Sept. 6, 1898.
T. F. LEES.
COUPLING FOR PIPES AND HOSE.
(Application filed Oct. 6, 1897.)

(No Model.)

Witnesses.

Inventor.
Theodore F. Lees

UNITED STATES PATENT OFFICE.

THEODORE F. LEES, OF NEW YORK, N. Y.

COUPLING FOR PIPES AND HOSE.

SPECIFICATION forming part of Letters Patent No. 610,359, dated September 6, 1898.

Application filed October 6, 1897. Serial No. 654,278. (No model.) Patented in England February 12, 1895, No. 3,074.

*To all whom it may concern:*

Be it known that I, THEODORE F. LEES, a citizen of the United States, residing in the city, county, and State of New York, have invented certain new and useful Improvements in Couplings for Pipes and Hose, (which have been patented in Great Britain under No. 3,074, dated February 12, 1895,) of which the following is a specification.
This invention relates to improvements in the coupling described in Letters Patent of the United States of July 21, 1891, No. 456,295. In the present instance the coupling comprises in part a tubular major member having a flange about one or both of its ends and provided at one end with a tubular prolongation, preferably circumferentially corrugated, adapted to receive a section of hose if the coupling is to be used for flexible hose.
Within this major member is mounted a sliding tube having on it a collar or flange to form one abutment for a coil-spring, which is placed between this collar and a shoulder formed on the interior of the major member of the coupling. This inner tube projects out from the mouth or receiving end of the major member and extends back into the tubular prolongation of such major member at the end opposite to its mouth, where said tube has in it a slot engaged by a pin or stud in the major member, this stud forming a limiting-stop to limit the movement of the tube longitudinally in the major member of the coupling. The minor member of the coupling is also tubular. At one end it is adapted to fit snugly over the protruding end of the sliding tube in the major member of the coupling, and to fit snugly into the mouth or receiving end of said major member. The entering end of this minor member impinges on a packing-ring on said inner sliding tube, which ring is seated on the outer face of the flange on said tube. On the minor member are two oppositely-arranged outwardly-projecting locking-studs, which when the two members are being put together in coupling pass through openings in the flange on the major member of the coupling and into an L-shaped locking-slot in the latter, whereby one member of the coupling is locked to the other, the inner sliding tube being pushed back, compressing the cushion-spring, in order to effect the locking.

Figure 1:
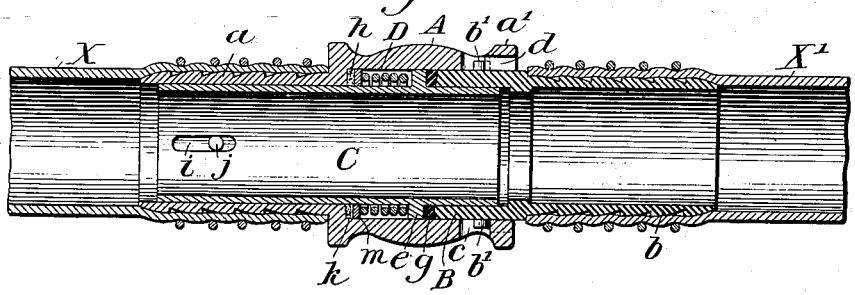
Figure 2:
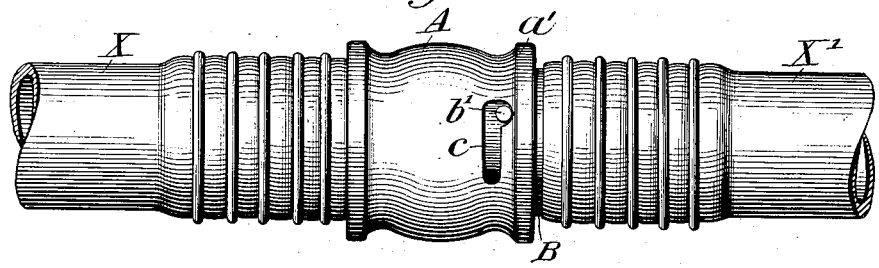
Figure 3:
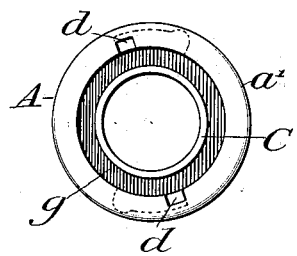

In the accompanying drawings an embodiment of this invention is illustrated, Figure 1 being a longitudinal axial section thereof, Fig. 2 a plan view, and Fig. 3 an end view, of the major member, showing its receiving end.

A is the major member of the coupling, provided with a prolongation *a* for the attachment of the hose X and with a flange *a'* at its mouth or receiving end.

B is the minor member, which is provided with a prolongation *b* to receive the hose X' and with locking-studs *b'* to engage locking-slots *c* in the major member, the studs *b'* passing through passages or openings *d* in the flange *a'*.

C is the sliding tube in the major member, this tube having a flange *e* and packing-ring *g*.

D is the spring between the flange *e* and a shoulder at *h* on the major member.

In the tube C is a slot *i*, which is engaged by a stud *j* on the major member A. This slot limits the movement of the tube C, under the influence of the spring D, when the members of the coupling are disengaged.

It will be noted that in the construction of the Patent No. 456,295 the hose X is secured to the tube C or what corresponds thereto, while in the present case it is secured to the major member and not to the tube C. Moreover, in the present case the entering end of the minor member B, where it bears on the packing-ring *g*, is slightly beveled, so that it tends to press the latter outward against the inner wall of the major member and produce a very tight joint. This construction obviously prevents the separation of the parts at the packed joint when there is a tensile strain on the hose—as, for example, when the pull on the hose X is resisted by a pull on the hose X'.

Preferably there will be interposed between the end of the spring D and the shoulder *h* a packing-ring *k*, resting against said shoulder, and a washer *m*, resting on the packing, to protect the latter from abrasion by the spring.

The packing *k* is a safeguard against leakage about the tubular member C where it plays in the part a of the major member A of the coupling.

Having thus described my invention, I claim—

1. In a coupling, the combination with the major, female member A, having formed in one with it the prolongation a for the hose, of the flanged sliding tube C, mounted in the major member, the spring D, arranged between shoulders on the major member and said tube C, the minor member B, adapted to fit over the said tube C and into the major member, a packing-ring at the joint and a locking device to secure the major and minor members together, substantially as set forth.

2. In a coupling, the combination, with the major member A, having formed in one with it the prolongation a for the hose, and having a locking-slot, c, of the flanged sliding tube C, mounted in the major member and furnished with a limiting-slot i, engaging a stud on the major member, the spring D, and the minor member B, provided with locking-studs, as set forth.

3. In a coupling, the combination with the member A, provided with a prolongation a and an internal shoulder h, the member B, and means substantially as described for locking the members together, of the flanged tube C in the said members, said tube having a flange e, the packing-ring g, between the flange e and the end of the member B, the packing-ring k and washer m, adjacent to the shoulder h, and the spring C, between the shoulder e and washer m, substantially as set forth.

In witness whereof I have hereunto signed my name in the presence of two subscribing witnesses.

THEODORE F. LEES.

Witnesses:
PETER A. ROSS,
HENRY CONNETT.